April 21, 1970  R. L. SWARTZ  3,507,491
MULTIDIGIT-MULTISTORE CONTROL SYSTEM FOR A
DOCUMENT SORTING MACHINE
Filed Oct. 27, 1967  8 Sheets-Sheet 1

INVENTOR
RICHARD L. SWARTZ
BY
Kenyon, Palmer, Stewart & Estabrook
ATTORNEYS

April 21, 1970 R. L. SWARTZ 3,507,491
MULTIDIGIT-MULTISTORE CONTROL SYSTEM FOR A
DOCUMENT SORTING MACHINE
Filed Oct. 27, 1967 8 Sheets-Sheet 7
FIG. 3E
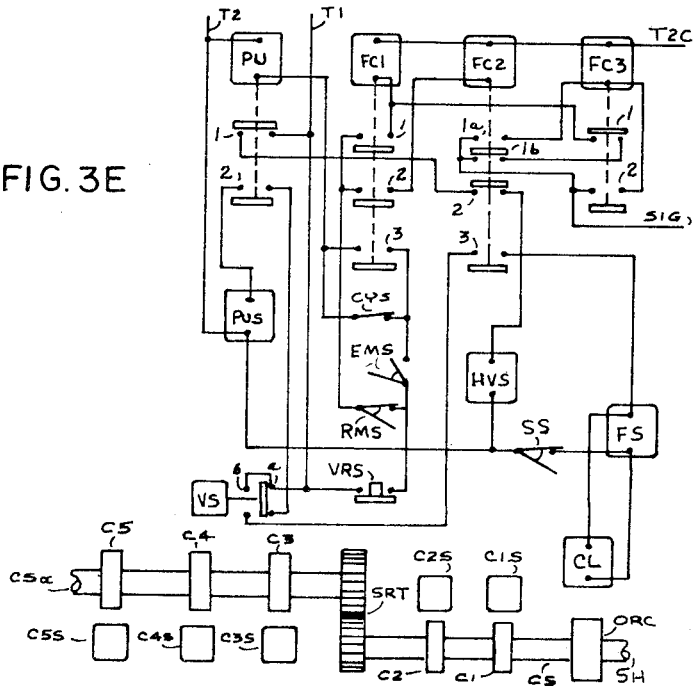
| FIG.3A | FIG.3B |
| --- | --- |
| FIG.3C | FIG.3D |
| FIG.3E | |
FIG. 4
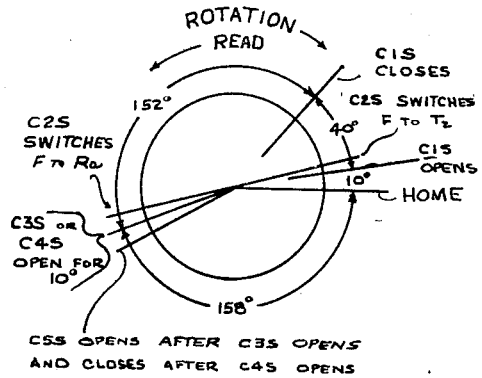
FIG. 5
INVENTOR
RICHARD L. SWARTZ
BY
Kenyon, Palmer, Stewart & Estabrook
ATTORNEYS April 21, 1970 R. L. SWARTZ 3,507,491
MULTIDIGIT-MULTISTORE CONTROL SYSTEM FOR A
DOCUMENT SORTING MACHINE
Filed Oct. 27, 1967 8 Sheets-Sheet 8

INVENTOR
RICHARD L. SWARTZ

BY Kenyon, Palmer & Estabrook
ATTORNEYS

United States Patent Office 3,507,491
Patented Apr. 21, 1970

3,507,491
MULTIDIGIT-MULTISTORE CONTROL SYSTEM
FOR A DOCUMENT SORTING MACHINE
Richard L. Swartz, Columbia, S.C., assignor to Universal Business Machines, Inc., Columbia, S.C., a corporation of South Carolina
Filed Oct. 27, 1967, Ser. No. 678,568
Int. Cl. B65h 29/36; H04q
U.S. Cl. 271—64
17 Claims

ABSTRACT OF THE DISCLOSURE

There is disclosed in the hereinafter specification an electrical control system for feeding documents to a moving trackway of a document sorting machine, and for effecting the entry of said documents into appropriate document receiving bins located along the trackway. Each of the document receiving bins has a gate or plurality of gates associated with it and located adjacent to the said trackway, the gate or gates being solenoid operated by distinct solenoids identified with each of the said gates. According to the invention each of the gate solenoids is operatively connected to each of a plurality of electrical signal stores. Input circuits are provided to transfer signal information indicative of a selected bin and gate to each of the said stores and control circuits are connected between the signal stores and the input circuits to control the addressing of input signals to the stores. Additional control means are provided for effecting the energization of gate solenoids in response to information in said stores, and for holding the gate solenoids energized for a sufficient length of time for the coded document to reach the selected gate. Circuit and mechanical means are provided to de-energize operated gates and erase filled stores.

Field of the invention

This invention relates to an electrical control system for a high speed document sorting machine wherein a large volume of documents, e.g., letter mail, may be rapidly sorted according to codes. Letter mail is used merely by way of illustration in that the postal system is presently employing a zip code wherein letter mail and the like may be processed according to selected digits of the zip code. According to the present invention the two most significant digits are used for coding. An example of such digits might be taken with respect to incoming mail arriving in a metropolitan area; in such a case the most significant digits of the zip code are the last two digits.

Prior art

This invention is an improvement over prior inventions owned by the assignee herein, and is specifically an improvement over the systems described in U.S. Patents: No. 3,021,509, No. 3,128,093, No. 3,201,114, and No. 3,259,238.

Patent No. 3,128,093 discloses a guideway, trackway and document receiving bins of the type employed with the control system of the present invention. FIGURE 2 of the drawings of the said patent is shown as FIGURE 6 herein and is labelled as the prior art. The figure is modified to show the control system of the present invention as a box, and to show a feeder of the prior art as represented by the disclosure of U.S. Patent No. 3,201,114 as a second box. As disclosed therein documents are placed onto a trackway comprising a plurality of gates 20 and stationary sections 22. The documents are moved therealong by a plurality of longitudinally displaced drive and idler rollers 14 and 16 respectively. The term "moving trackway" is utilized in this specification to documents given motion by the said rollers. Of course, other means may be substituted for the powered rollers and the moving trackway per se does not form part of the present invention.

The gates 20 are positioned at intervals along the trackway and when they are raised they cause the deflection of the document from the said trackway. A plurality of longitudinally displaced document receiving bins are defined by walls 28, 30, 32, 34 and 36 located beneath the trackway, and as shown in Patent No. 3,128,093, two bins are associated with each trackway gate 20, e.g. two bins are defined by the walls 28, 30 and 32. A second gate 26 is located beneath the trackway and is utilized as a means for diverting a document deflected from the moving trackway into either of the two said bins. With reference to the present invention all gates whether they be located along the trackway or beneath it are solenoid operated, i.e., they are moved into an operative position by the energization of a solenoid.

Patent No. 3,201,114 discloses the mechanical document pickup system employed with the control circuitry of the present invention. As disclosed in the said patent a vacuum cup is caused to move along two axes such that it may be lowered to retrieve a document from a stack of documents and retracted for the purpose of delivering the document to an input drive roller-idler roller pair which roller pair delivers the document onto the moving trackway.

An electrical control system is disclosed for effecting the movement of the vacuum cup and for causing a vacuum to be applied to or cut off as the case may be to the cup. An improved electrical feed control system is disclosed in the present invention in that it was found that the system disclosed in Patent 3,201,114 on occasion failed due to the fact that too many functions were combined into too few electrical relays thus creating a problem of contact bounce which on occasion caused a document to be dropped prior to its feed into the input rollers.

Patent No. 3,259,238 discloses a single digit input system utilized in conjunction with a double store control system to effect the selected operation of gates along a relatively short trackway. Problems occur respecting the use of such a system with highspeed and long trackway document sorters such as that contemplated by the present invention. For example, the system described in Patent 3,259,238 requires the holding of information in a store approximately until the document arrives at the selected bin. The store is therefore not capable of being reused until the document is actually fed to the bin. The hereinafter described control system allows, among other things, for the operation of the gate solenoids, and the removal of the information from the stores after the gates have been opened. Thus unlike the system shown in Patent No. 3,259,238 the stores become available for new information while selected ones of the gate solenoids are energized.

It was also found that the camming switches of Patent No. 3,259,238 and the functions performed by them although suitable to a relatively short trackway and a digit input were not suited in their number of operations and their timing cycles to a long trackway machine as contemplated by this invention.

Patent No. 3,021,509 describes a long trackway machine having one pocket less than that contemplated for use with the control system of the present invention. In addition, the control system described in Patent No. 3,021,509 is for use with a much slower machine than that contemplated by the present invention. The system therein disclosed requires the entry of information into gate operating and selecting relays which effected the opening of the selected gate. However, new information cannot be entered into the control system of Patent No. 3,021,509 until delivery of the document to the appropriate bin is completed to thus allow the gate associated with the bin to be closed, and to allow the information utilized to select the gate to be erased from the system such that the system is free to receive new information. Thus, it will be recognized that if a document was designated for pocket 98, assuming pocket 98 is located at the far end of the trackway, that the performance of the prior art control system would be very slow relative to that of the system contemplated by the present invention.

It was determined that in order to achieve the high speed processing of documents, and to overcome the deficiencies of the machines of the prior art it was necessary to provide a control system that would allow for a plurality of documents on the moving trackway at any given time. It was also determined that the number of documents on the trackway is in part a function of the number of signal stores employed and in part a function of the time required for a document to arrive at its appropriate gate.

Accordingly, it is a principal object of this invention to provide a new and novel control system for a high speed document sorting machine provided with a relatively large number of document receiving bins.

It is another object of this invention to provide a keyboard operated, multi-digit, muti-signal store system for a large volume document sorting machine wherein information relating to the storage of documents is cycled between a plurality of signal stores, and wherein a document can be stored after the information relating to its storage bin in cancelled from the signal store used for the document.

It is a further object of this invention to provide a new and novel control system for a high speed document sorting machine that prevents a false cycling of the machine during a document feeding operation.

These and other objects of the invention will become clear upon a reading of the hereinafter specification which describes a specific embodiment of the invention taken in conjunction with the drawings in which:

FIGURE 3 is a wiring diagram of the control system of the invention and consists of FIGURES 3A through 3E;

FIGURE 4 is a diagram showing the manner in which FIGURES 3A through 3E are to be assembled together;

Figure 6:
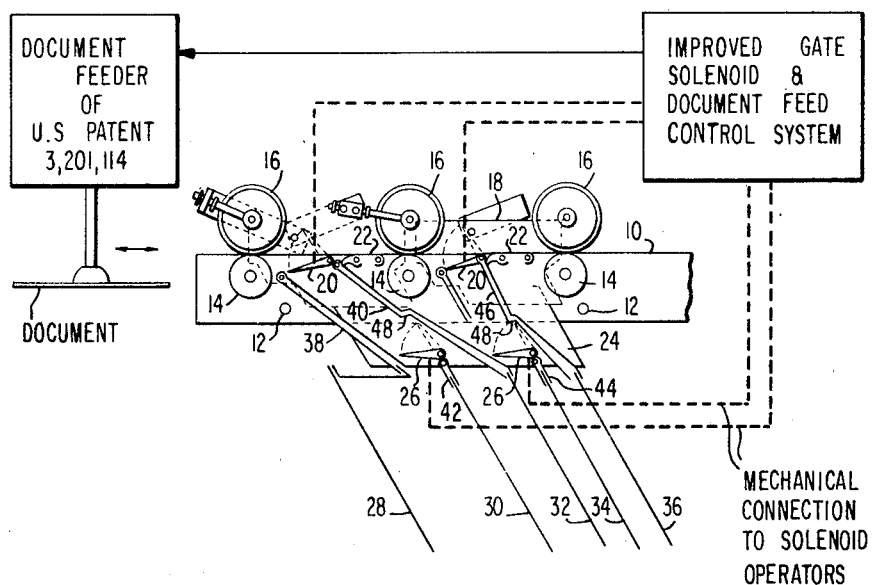

FIGURE 5 is a timing diagram showing the timed relationship of operation of a group of camming switches; and, FIGURE 6 is a sectional view in side elevation of the document sorting machine of U.S. Patent No. 3,128,093 and is shown with box representations of the control system of the present invention and the document feeder of U.S. Patent No. 3,201,114.

General operation

Figure 1:
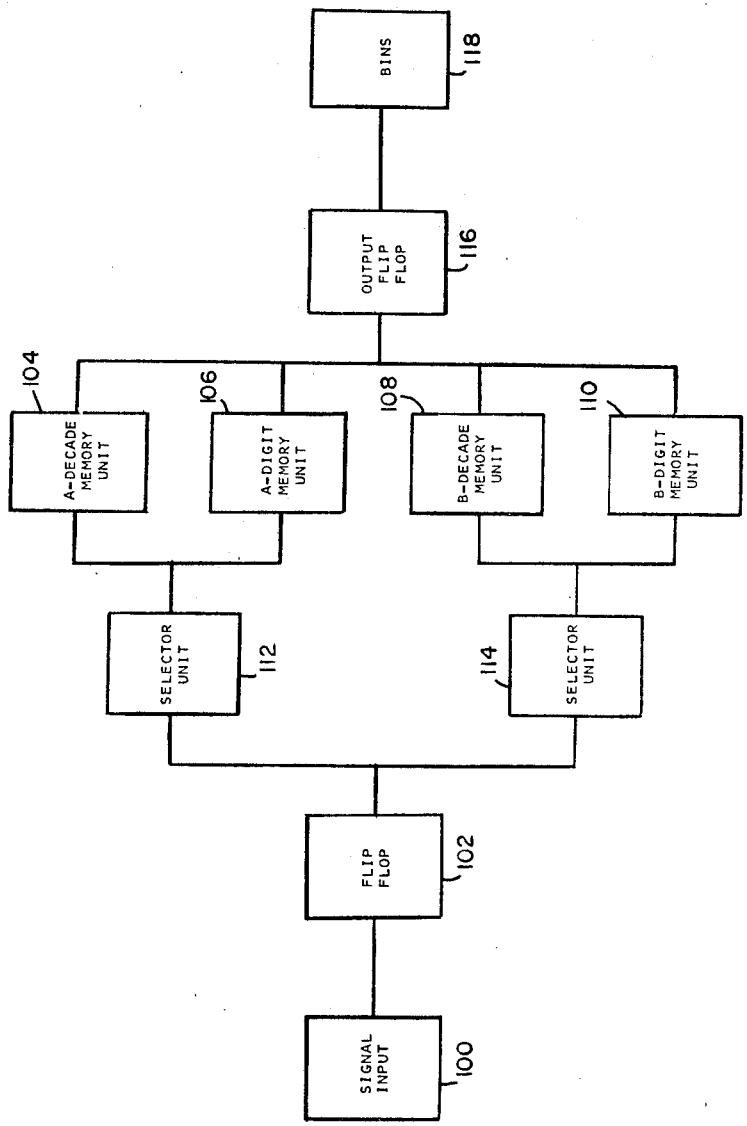
FIGURE 1 is a block diagram of the control system of this invention.
Figure 2:
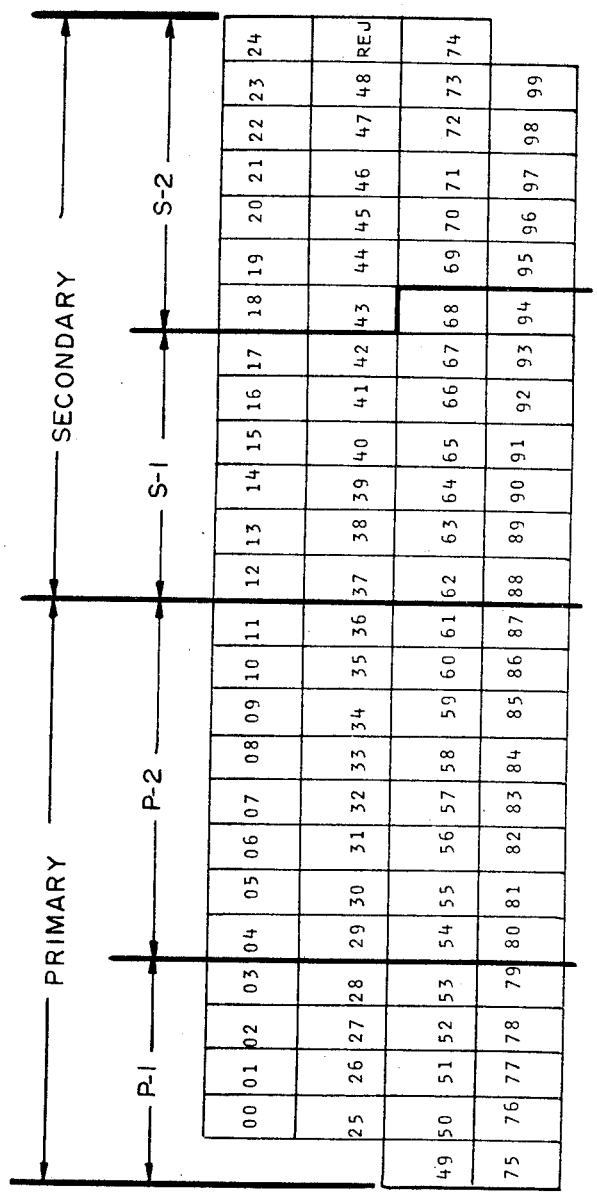
FIGURE 2 is a diagram showing the location of the document receiving bins and gates along the trackway.

Referring now to FIGURES 1 and 2 of the drawings, according to the present invention a signal is inputted into the system by signal input means 100 and passed to a first selector unit 102. It is the function of the first selector unit 102 to cycle the input signal between and to the individual signal stores contemplated by this invention. As shown in FIGURE 1 a first signal store consists of an A decade memory unit 104 and an A digit memory unit 106. A second signal signal store is shown comprising a B decade memory unit 108 and a B digit memory unit 110.

The A memory unit is connected to the selector 102 through a second selector unit 112 which is utilized to connect the A decade memory or the A digit memory to the selector 102. In a like manner the B store is connected by a selector unit 114 to the selector 102 for the purpose of transferring information into either the B decade memory 108 or the B digit memory 110. Although only two memory units have been shown in FIGURE 1 of the drawings it is contemplated that the system can be expanded to handle additional signal stores and memories through the expansion of circuitry and through the addition of further selector units and input means.

Each of the memory units 104 through 110 is connected on its output side to a final selector 116 which utilizes the information in the memory units to effect the final selection of a gate solenoid. The gate solenoids, gates and bins have been represented as block 118 in FIGURE 1, which is shown connected to the final selector 116.

In that the control system of the present invention is contemplated for use with a 100 bin document sorting machine, the actual lay-out of the receiving bins has been schematically illustrated in FIGURE 2 of the drawings. It will be noted that the trackway is divided longitudinally into primary and secondary document receiving bin sections and that each of the said sections is further subdivided. Thus the primary section consists of a front subsection P–1 and a rear sub-section P–2 while the secondary section of the trackway consists of a front subsection S–1 and a rear sub-section S–2. The pockets located in the P–1 sub-section are at the very front of the trackway, i.e., the trackway input, and the P–2, S–1, and S–2 sub-sections are longitudinally displaced along the trackway from the sub-section P–1.

Although the pockets appear to be shown in groups of four each pocket is longitudinally displaced from a second pocket and as contemplated by the present invention none of the bins are laterally displaced of each other. The first bin along the trackway, i.e., at the input, is bin No. 49 with the second bin being No. 75. Document storage bin 75 is followed by bin 00 which in turn is followed by bin 25. The fifth receiving bin is 50 followed by 76 which is, in turn, followed by storage bin 01. The said sequence continues throughout all of the sub-sections of the machine.

Figure 3A:
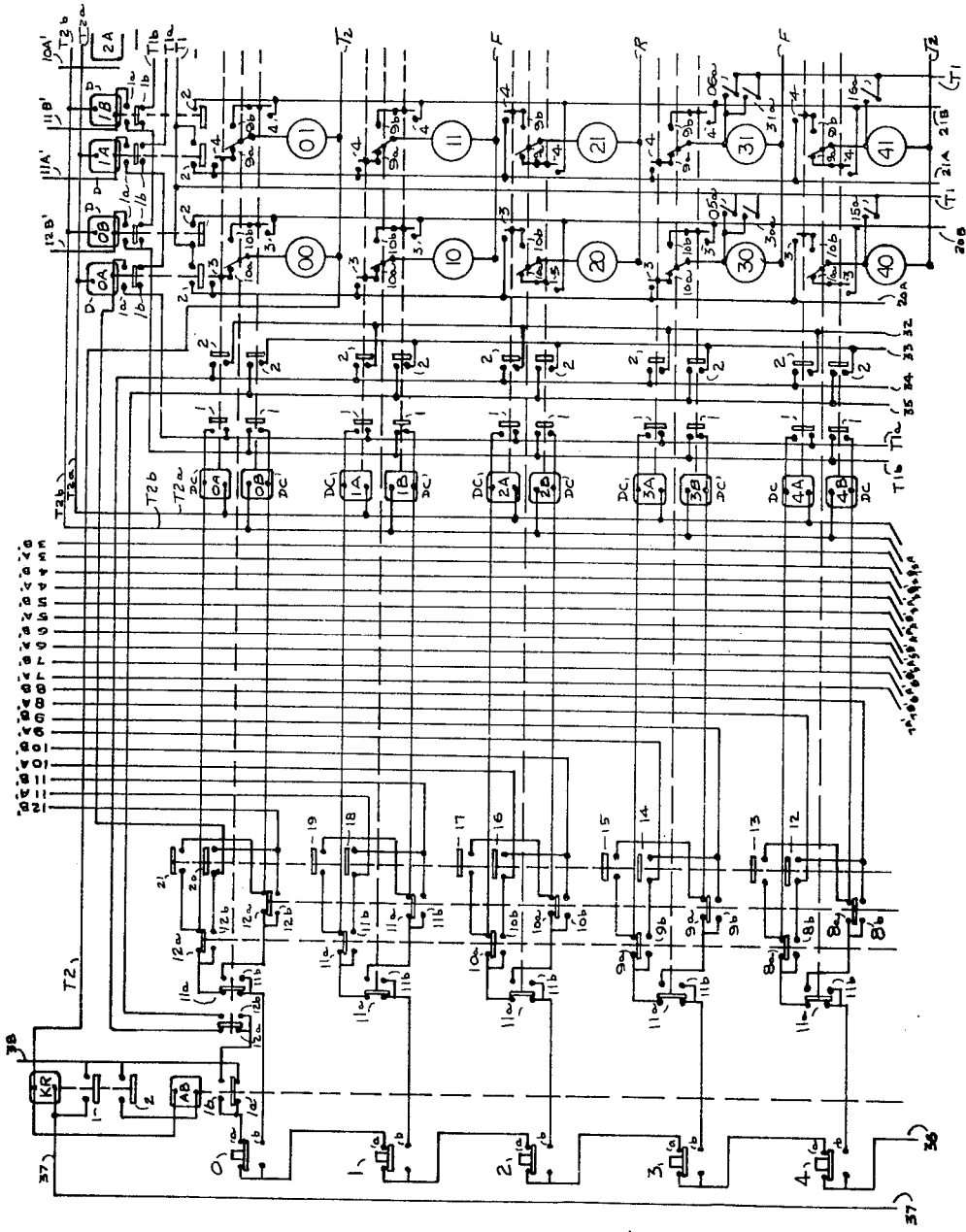
Figure 3B:
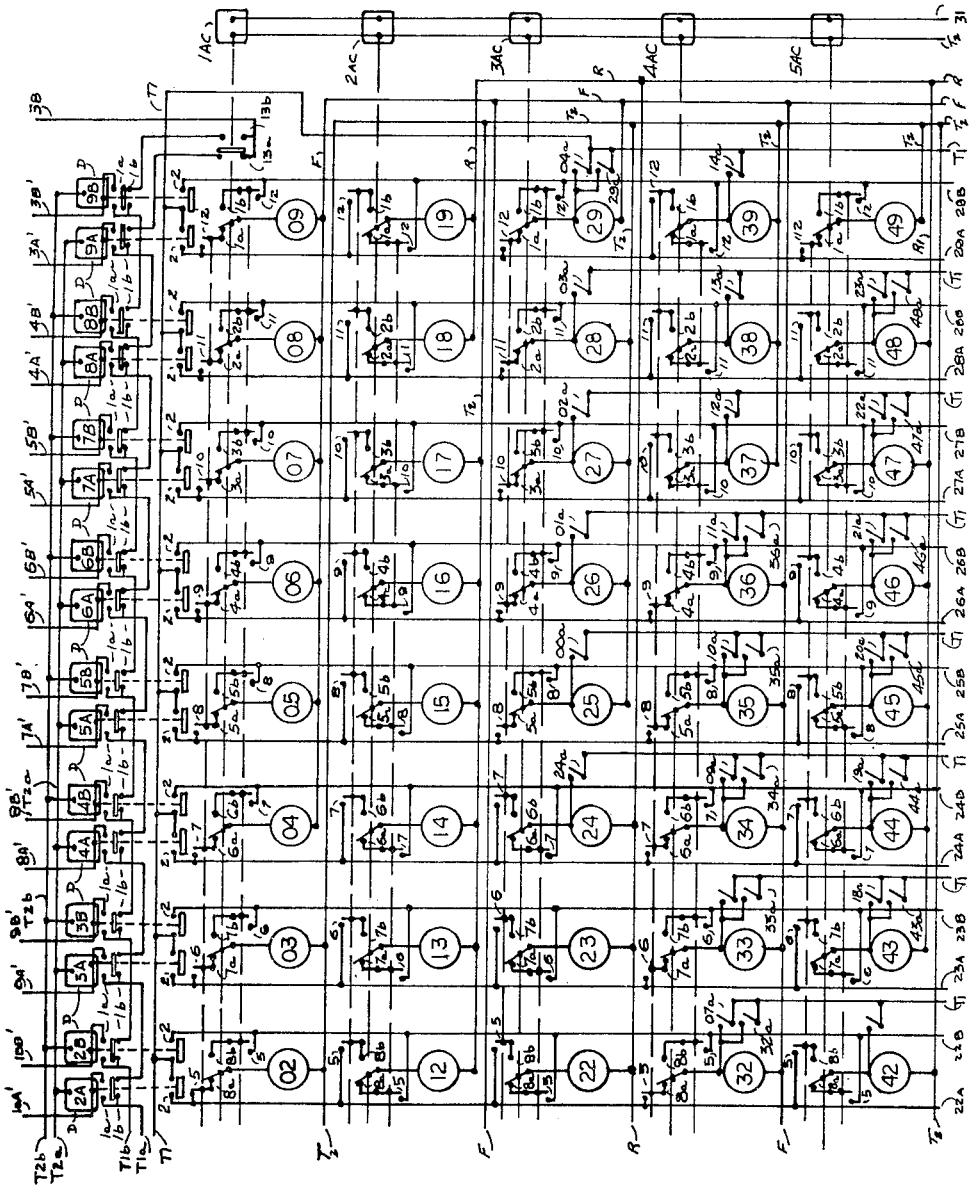
Figure 3C:
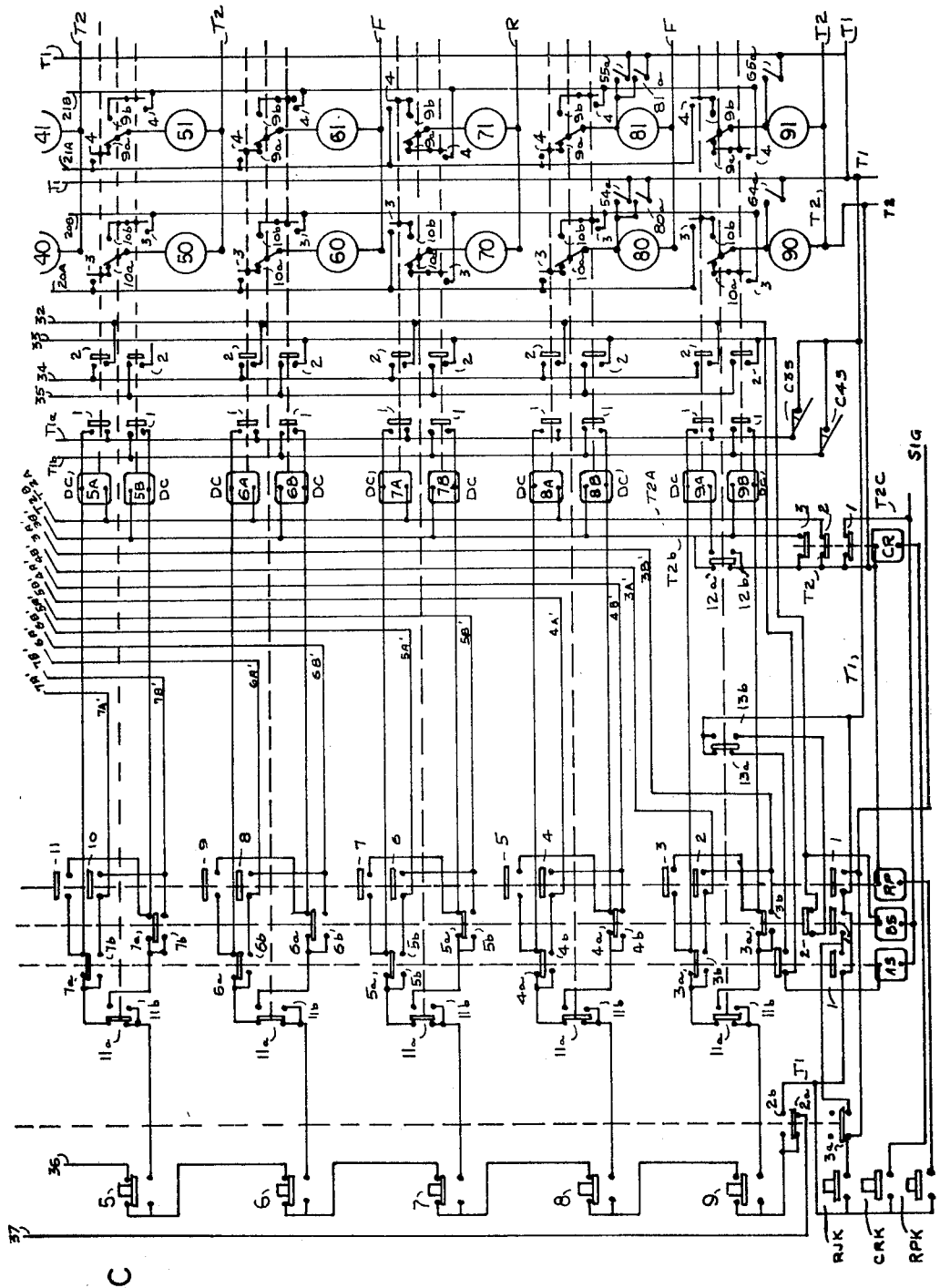

Referring now to FIGURES 3A through 3E of the drawings it will be assumed that the control system for the document sorting machine has been turned off and that it is desired to initiate a sorting operation. Referring specifically to FIGURE 3C of the drawings and to the lower right hand corner thereof it will be noted that two lines marked T2 and T1 are connected into the system. The said lines constitute bus lines or that is, power lines, which may be suitably fused and connected through the usual on-off switches to a source of electrical power. As shown in FIGURE 3, T2 is a hotline and all of the relays and solenoids are either directly connected or connected through special purpose switches to the line T2. In applying information to the machine to select a gate solenoid all relays and solenoids utilized in the selection process are switched onto the bus line, T1, to effect their energization. Essentially, the only switching operation carried out with respect to the line T2 is used for a voltage reduction purpose which will be described below.

Assuming the circuit is in the condition shown in the drawing the closing of the start-up switch, not shown, effects the completion of a series circuit on a line T1a connected to a switch C3S in FIGURE 3C of the drawings. The conductor T1a is shown series connected in FIGURES 3A and 3B with all of the 1b contacts of a plurality of digit relays D–0A through D–9A and T1a is connected in series with contacts 13a of an alternate store transfer relay 1AC (FIG. 3B) to a conductor 38. Conductor 38 picks up in FIGURE 3A and is series connected through contacts 1a of a relay AB to a conductor 36 which conductor connects 10 conductive keys 0 through 9 located on an operator's keyboard in series through contacts 2a of the relay AB to a line 37 (FIG. 3C). The line 37 completes a circuit to one side of a relay KR, the other side of which is connected to the hotline T2 as shown in FIGURE 3A. By closing a power supply switch the relay KR is energized such that its contacts 1 and 2 close. Contact 1 of the relay KR forms a holding circuit for KR from line 38 to line 37, and contacts 2 of the relay KR apply line 38 to one side of the relay AB; the other side of the relay AB is tied in parallel to KR on the line T2 side of KR. The energization of relay KR thereby effects the energization of relay AB causing the AB contacts to transfer themselves and in particular, causing contacts 2A of relay AB to transfer to 2B thus placing line 36 directly onto line T1 as shown in FIGURE 3C of the drawings. This particular operation completes the initial set-up of the control system such that it is now ready to receive information for the purpose of feeding documents to selected document receiving bins. It should be noted that an alternate route for connecting line 38 in FIGURE 3B to line T1 in FIGURE 3C is established when the alternate store transfer relay 1AC is energized such that its contacts 13a transfer to 13b. Under this circumstance line 38 is connected to line T1b through a series circuit comprising the 1b contacts of digit relays D–0B through D–9B; FIGURES 3A and 3B. Line T1b is also connected in the series with a switch C4S and to T1 as shown in FIGURE 3C. It will therefore be seen that lines T1b and T1a constitute parallel circuits from the input bus line T1 to line 38.

With the AB and KR relays now energized the remaining circuits can receive information from the keyboard. The operation of the circuits and their cooperation with the document sorting machine is described below with respect to selected individual document receiving bins and the appropriate gate or gates for the bins in each of the trackways subsections as shown in FIGURE 2. It is believed that those skilled in the art will fully appreciate the complete operation of the control system and the machine from this description.

Energization of gate 51 in the P–1 section of trackway

All relays and solenoids shown in FIGURES 3a–3d with the exception of KR and AB are de-energized. Consequently, contacts 11a (FIGURES 3a and 3c) of alternate store transfer relays 1AC–10AC (FIGURES 3b and 3d) are closed. Therefore, when the machine operator first presses keys on the keyboard signals will be entered into the A decade and digit stores. The A decade stores comprise the relays DC–0A through DC–9A, FIGURES 3a and 3c. The A digit stores comprise relays D–0A through D–9A, FIGURES 3a and 3b.

In order to energize gate solenoid 51 the operator first presses key 5 to thereby establish a circuit from line 36 through contacts 11a of relay 6AC, and contacts 7a of a cycle A selector relay AS to decade relay DC–5A thus applying power from line 36 through coil DC–5A to hotline T2 causing the energization of decade relay DC–5A. Contact 1 of DC–5A closed to establish a holding circuit for the relay from line T1a. DC–5A also electrically connected its number 4 contact to a line 21A thereby applying line 21A to gate solenoid 51 through contact 9a of relay 6AC. The gate solenoid 51 is connected on its other side to the hotline T2, but is unenergized since line 21A is open.

Key 5 is now released and allows current to flow through contacts 1b of the energized relay AB thus establishing current flow in a line 34 through contacts 12a of the alternate store transfer relay 1AC; see FIGURE 3a. Line 34 connects to line 32 (FIGURE 3c) through the now closed contacts 2 of DC–5A to thereby apply T1 potential to one side of the cycle A selector relay AS; AS is connected on its other side to T2c and is thus energized and reverse its contacts.

The operator now presses key 1 to complete a circuit to line 11A' in FIGURE 3a through contacts 11a of relay 2AC and 11b of relay AC. Line 11A' is connected to digit relay 1–A which relay energizes causing all of its contacts to reverse thus connecting bus line T1 through the now closed contacts 2 of the digit relay D–1A to line 21A. Power is thus applied to the gate solenoid 51 from line 21A through contacts 4 which closed during the decade operation and the normally closed contact 9A. The track gate for the document receiving bin corresponding to solenoid 51 immediately opens such that the document coded for bin 51 will be deflected into the bin from the trackway when it reaches gate 51.

At the time digit relay D–1A energized its contacts 1b broke and made with 1a, thereby opening line T1a and consequently line 38 in FIGURES 3a and 3b. Thus power was removed from relays AB and KR such that their contacts reversed to the positions shown in FIGURES 3a and 3c.

A feature of this circuit should be immediately apparent. With power removed from line 38 the series circuit of keys 0–9 on line 36 is open thus at this point the operator cannot enter a new signal into the system until AB and KR reenergize. By this means false feeding operations are prevented while the machine feeds the document, bearing the coded information that has just been punched into the machine, onto the trackway.

Feed cycle

With the de-energization of relay AB its contacts 3a apply a signal from line T1 through the now closed contacts 1 of relay AS to a feed cycle signal line SIG.

Referring now to FIGURE 3e, the vacuum pickup mechanism of Patent 3,201,114 is positioned above the document for which bin 51 was coded. First, it should be noted that a cycle selector switch CYS is open and that switch EMS is closed. With the switches in the stated position the machine is in a full cycle condition.

With T1 on line SIG a signal is applied as aforestated to feed cycle relay FC1 through normally closed contacts 1b of relay FC2 and the norcally closed contacts 1 of relay FC3; FC1 energizes in that it is connected on the other side to hotline T2c thereby reversing its contacts. A holding circuit for FC1 is established from now closed contacts 1 of the relay, through a closed feed retract switch RMS, and a vacuum release key VRS to T1.

A circuit is established to a relay PU from T1 by virtue of the operation of relay FC1, through key VRS and the now closed contacts 3 of FC1. The relay PU is connected on its other side to hotline T2. With the energization of relay PU its contacts reverse thereby connecting T1 to a pickup solenoid PUS through contacts 2 of PU. Contacts 1 of relay PU open a normally closed circuit to a vacuum solenoid HVS which had previously been energized from contacts 1 of relay PU, normally closed contacts 2 of relay FC2, the solenoid HVS to T2. With the pickup solenoid PUS energized the vacuum feed cup moves downward against spring tension into contact with the top document on the stack. Upon de-energizing the solenoid HVS the feed cup valve is opened thereby connecting a vacuum pump to the vacuum pickup cup such that the cup is able to pick up the coded document. As the pickup cup moved downwards it tripped a safety switch SS to prevent the energization of a feed solenoid FS and a clutch solenoid CL during the document pickup operation. When the cup ascends the safety switch SS closes to reapply hotline T2 to the solenoids FS and CL.

As a vacuum builds up the vacuum switch VS operates to change its contacts from a to b thereby opening the circuit to pickup solenoid PUS and consequently causing the upward movement of the vacuum pickup cup under spring tension. At the time FC1 was energized its contact 2 closed thus placing T1 of feed relay FC2 through the key VRC, switch RMS, and the now closed contacts 2. FC2 is energized reversing its contacts; in so doing its contacts 1a make with line SIG and with feed relay FC3 thereby creating a holding circuit for FC2 and energizing FC3. As FC3 energizes its contacts 2 reverse to connect and hold FC3 on line SIG. Contacts 1 of FC3 break the connection from SIG to FC1 and FC1 holds as previously described.

Returning now to FC2 it will be noticed that its contact 2 also broke the circuit to valve solenoid HVS thus ensuring the de-energization of the solenoid during the feeding operation and the maintenance of a vacuum on the pickup cup. At the same time contacts 3 of feed relay FC2 applied T1 to the feed solenoid FS and clutch solenoid CL through the closed contacts b of the vacuum switch VS. Since the switch SS closed with raising of the pickup cup the solenoids FS and CL are energized. The feed solenoid FS causes the feed valve to operate and connect a vacuum pump to a vacuum cylinder which is connected to the feed cup, thus allowing atmospheric pressure to act on the exposed side of the piston in cylinder to thereby cause the feed cup to start moving to the document delivery position. As the feed cup starts moving away from the document pickup position an extend switch EMS is allowed to open, breaking the energizing circuit of relay PU. As the feed cup approaches the delivery position the retract switch RMS is opened thereby breaking the holding circuit for relays FC1 and FC2 de-energizing relays FC1 and FC2 whose contacts return to the position shown, thus de-energizing solenoids FS and CL and energizing solenoid HVS to cut off vacuum to the feed cup and feed cylinder. The feed cup then returns by spring tension to the position over the next document.

The pickup and feed apparatus associated with the circuitry of FIGURE 5 is disclosed in Patent No. 3,201,114. The present invention constitutes an improvement of the circuitry disclosed in the said patent in that the pickup and feeding operations provided by the herein disclosed circuitry are performed in a series of discrete steps made possible by the use of additional circuit elements arranged in a new circuit configuration. Although the previous circuitry was operative it occasionally malfunctioned in that the contacts associated with the two feed relays disclosed did not hold on occasion probably because of contact bounce.

The feed solenoid effects the transfer of the picked up document to a pair of trackway feed rollers of the type heretofore described.

Operation of the camming switches C1S through C5S

With energization of the clutch solenoid CL a clutch ORC is thereby engaged for one revolution and during the said revolution it connects a continuously rotating shaft SH to a cam shaft CS. Two cams C1 and C2 are mounted for rotation on shaft CS. A second cam shaft CSA is coupled to shaft CS by a speed reducing gear SRT such that shaft CSA rotates one-half revolution for each revolution of the shaft CS. Three cams C3, C4 and C5 are mounted for rotation of shaft CSA. There is associated with each of the cams a corresponding cam switch which switches are shown as blocks in FIGURE 3e and by electrical symbols in FIGURES 3c and 3d. The said switches perform a variety of functions. C1s is utilized to connect the gate solenoids of section P–2 of the trackway to T2 and to a reduced voltage line Ra. C1S is also used to de-energize operated gate solenoids in section P–2. C2S is electrically connected to C1s and is used to switch between hotline T2 and the reduced voltage line Ra. Since both C1 and C2 are mounted on shaft SH the switches are operated on each cycling of the clutch ORC. Switches C3S and C4S are utilized to cancel the A and B stores respectively and to energize the relays KR and AB thereby restoring the keyboard to operation. Since cams C3 and C4 are mounted on CSA they are turned through only one-half revolution for each revolution of the clutch. Consequently, cams C3 and C4 are fixed such that if information is inputted to signal store A as described with respect to gate 51, then upon the cycling of ORC commenced as a result of the input function, C4 is effective to trip C4S and cancel information previously stored in signal store B. If information had been inputted to signal store B then the cycling of ORC causes C3 to switch C3S to erase information from the A store. C5S is used to switch circuits such that if the A store had been previously used the next input signals must be inputted to the B store. Consequently C5 and C5S are used to cycle the selection of the signal store to which input information is to be processed. C5 and C5S perform other functions which will be described hereinafter.

Figure 3D:
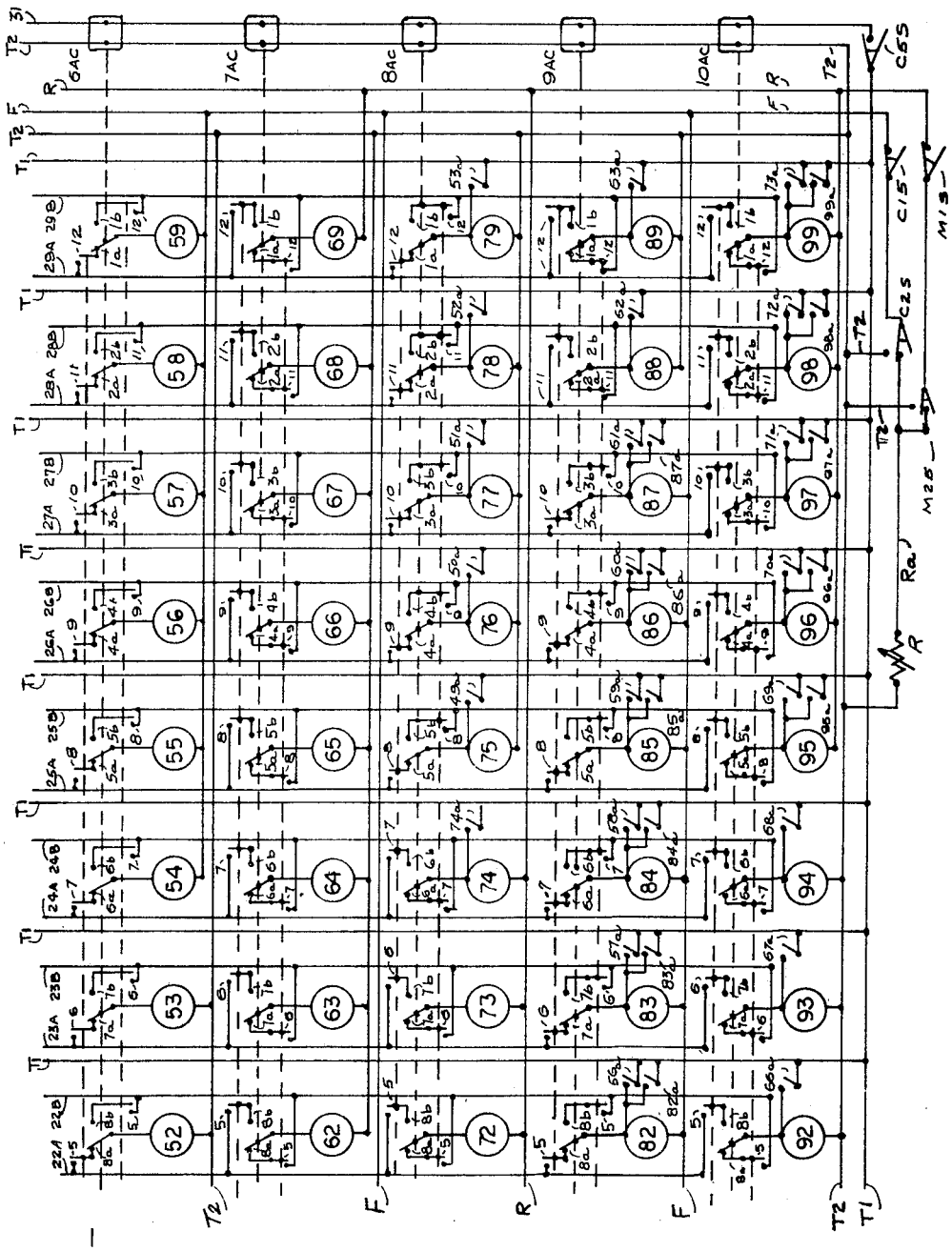

The time of the switching operations provided by the cams C1 through C5 will be described with reference to FIGURE 5 of the drawings. Starting from the position labeled HOME the switch C1S is opened by the cam C1 for a period of 40 degrees of rotation of the cam. The switch C1S is shown in FIGURE 3d of the drawings and it will be noted that it is connected in series with switch C2S and a voltage dropping resistor R to T2. C1S is also connected to a common line F which line is connected to one side of all of the gate operating solenoids in section P–2 of the trackway. When C1S opens voltage is removed from line F thus breaking the circuit to any gate solenoid relay in P–2 that had been operated. The solenoid is thereby de-energized and closes its associated gate in the trackway. C1S closes approximately 40 degrees after it opened thus closing line F to switch C2S. Shortly after C1S opened, C2S is switched from the reduced voltage line RA to the hotline T2, such that when C1S closed again the full potential of the hotline T2 is applied to the line F. As will be obvious, C2S is thus used to switch from the full potential of the line T2 to a reduced potential on the line Ra which reduced potential is determined by the amount of resistance in the line RA, provided by the variable voltage dropping resistor RA. The voltage provided to line F from line RA is insufficient to energize a solenoid in section P–2 whereas the voltage from T2 is sufficient. The low voltage is used to hold an operated gate solenoid in section P–2 energized for a sufficient length of time such that the associated gate will be held open until the document coded for the gate arrives at the gate to be deflected into the appropriate document receiving bin.

The holding voltage from RA is used to hold a gate energized for one cycle of clutch ORC. That is, if the input signals selected a gate in section P–2 then the gate is open at about 50 degrees of rotation of cam C1. The gate is held open until the next cycling operation of ORC or, i.e., until the next opening of C1 as is described under the sub-title dealing with the selection of a P–2 gate. This sequence is used in that for this specific embodiment of the sorting machine the speed of travel of the document is related to clutch speed as follows: The document traverses section P (P–1 plus P–2) in about the amount of time it takes the clutch ORC to move through 360 degrees of rotation. Accordingly, it takes about 120/146 seconds for the document to travel the full length of the moving trackway.

As shown in FIGURE 5, cam C2 again switches C2S at a point of 180 degrees from the point where C2S was first switched. At the second switching of C2S line F is switched to line RA. Of course, C2S can be switched at any point after C1S closes except it must be before the operation of either C3S or C4S and C5S. The next switch to operate is C3S or C4S. The switch [C3S or C4S] to be operated is dependent on whether or not its the A store decade and digit information that is to be cancelled. As shown in FIGURES 3A through 3D, switch C3S cancels information in the A store and switch C4S cancels information in the B store. Since each of the said switches is utilized to cancel information they need be operated for only a short period of time, for example, the switches need be opened for only approximately 10 degrees of a revolution of CSA.

As previously described, information was read into the A store to operate gate solenoid 51. For the purpose of describing the operation of C5S and cam C4 it will be assumed that information had previously been entered in the B signal store and at this point that information is to be cancelled. The B stores are cancelled by the operation of C4S by C4. Since C3 is 180 degrees out of phase with C4, C3S cannot be operated to cancel information in the A signal store until ORC is cycled a second time.

Reverting to FIGURE 3d the operation of switch C4S by C4 opens line T1B and thereby breaks all holding circuits for the decade relays DC–0B through DC–9B, and at the same time removes the potential from all holding circuits for the digit relays D–0B through D–9B. In a like manner when C3S is operated on the next cycling of the clutch ORC bus line T1A is opened thus breaking the holding circuits for the decade relays DC–0A through DC–09 and the digit relays D–0A through D–9A. When C4S closes again line T1b is closed and set to energize relays 2R and AB upon the transferral of conacts of relay 1AC.

The remaining cam C5 is utilized to alternatively switch the A store and the B store to the keyboard and does so by closing and opening C5S thereby energizing and de-energizing the alternate store transfer relays 1AC–10AC respectively as shown in FIGURES 3d and 3b. The cam C5 closes the switch C5S after the switch C4S opens and thereby connects the alternate store transfer relays 1AC–10AC to line T1 to effect the energization of the said relays. With the energization of the alternate store transfer relays, relay 1AC transfers its contacts 13 to 13b thus connecting line T1b to line 38 to energize relays KR and AB.

Simultaneously with aforementioned operation alternate store transfer relay 6AC reverses its contacts 9a to make a contact 9b, and in so doing it disconnects line 21A from gate solenoid 51. The gate solenoid is thus de-energized and consequently its associated gate on the trackway closes. This event occurs with the operation of C5S, but since the document has had sufficient time to travel one quarter the length of the trackway (corresponding to the length of the P–1 sub-section) the document is in storage bin 51 by the time C5S is operated.

Operation of the B store in conjunction with a document designated for bin 09 in the P–2 section of the trackway The previously described operation of transferring a document from the trackway into bin 51 also indicated that the gate to the said bin was closed upon the energization of the alternate store transfer relay 6AC whereby its armature associated with gate solenoid 51 moved from the contact 9A to the contact 9B to de-energize solenoid 51. It will be assumed for the purpose of this description that the next document under the document pickup cup is or will be encoded with the numerals 09 thus designating document receiving bin number 9 which bin is located under section P–2 of the trackway. It is to be noted at this point the gate solenoid for bin 09 operates a gate located beneath the trackway. The trackway gate, as indicated in FIGURE 2, is gate 34. It will be recalled that each trackway gate is associated with two storage bins thus in the case to be described gate 34 deflects documents from the trackway for both bins 34 and 09; gate 09 when operated, prevents the entry of the descending document into bin 34 such that it must enter bin 09. The structure of the bins and gates is shown in Patent No. 3,128,093.

The machine operator first presses key 0 to establish a circuit from line 36 through the now closed contacts of the 0 key, contacts 11b, (which transferred from 11a to 11b upon energization of relay 1AC) contacts 12A of the cycle B selector relay BS, and thus to one side of the decade relay DC–0B the other side of the said relay being connected to the hotline T2b. Decade relay DC–0B is thereby energized causing its contacts to reverse, and in so reversing a holding circuit is created for the decade relay by its contacts 1 which connect line T1b to one side of DC–0B.

Referring to FIGURE 3b it will be noticed that a second movable armature of the decade relay DC–0B makes contact with a stationary terminal 12 to connect line 29B to the terminal (see the solenoid 09 circuit). Since the movable armature associated with relay 1AC and the gate solenoid 09 is in contact with contact 1b by virtue of the energization of 1AC a series circuit is now completed from the gate solenoid to line 29B. However, line 29B is open with reference to line T1 in that the digit relay D—9B has not been activated, thus contacts 2 of D-9B are open as shown.

The B cycle selector relay BS is energized in much the same fashion as the A cycle selector relay AS was energized with reference to the opening of gate 51 as hereinbefore described. It will be recalled that in energizing relay AS a potential was applied to it when key S was released. In a like manner the potential of line 36 is applied through the 0 key upon release and the now closed contacts of 12b of relay 1AC to line 35. Line 35 connects with a line 33 through the now closed contacts 2 of decade relay DC–0B. Line 33 connects to cycle selector relay BS (FIGURE 3c), the other side of relay BS being connected to line T2c. Cycle selector relay BS energizes and reverses all of its contacts. Contacts 2 of relay BS form a holding circuit for the relay from line T1 through the now reversed contacts 13b of relay 10AC.

The operator now punches key 9 at the keyboard to complete a circuit from T1 through the closed contacts 2b of relay AB, the reversed contacts 11b of the alternate store transfer relay 10AC, the now reversed contacts 3b of the cycle B selector relay BS to a line 3b'. The conductor 3b' continues from FIGURES 3c through FIGURE 3A to FIGURE 3B of the drawings and thence to one side of the digit relay D–9B, the other side of the said relay being connected to the hotline T2b. The said digit relay is thus energized causing its contacts to reverse thereby completing a circuit from the line T1 through the now closed contacts 2 of the relay D–9B, contact 12 of the decade relay DC–0B and the now closed armature, the reversed armature of relay 1AC and contact 1b, through gate solenoid 09 to power line F. The gate solenoid, however, is not energized in that F is connected to line RA through switches C1S and C2S.

As stated heretofore in order for a document to be placed in bin 9 it is also necessary to energize trackway gate 34. There is a connection made from the bottom of the movable armature associated with solenoid 09 and relay 1AC to a movable switch 09a connected to the top side of gate solenoid 34. This same type of connection is made from gate solenoid 04–11 to solenoids 29–36; 54–61 to 80–87, and in a like manner for the S–2 section of the trackway with the exception of gates 24 and 74 for which special arrangements are made. It is thus seen that whatever potential is placed at the top of solenoid 09 is also placed at the top of gate solenoid 34 when 09 energizes to close its contacts 09a.

Following the transfer of operation from signal stores A to stores B the power line 38 for the relays KR and AB of FIGURE 3a was transferred from contacts 13A to contacts 13B of alternate store transfer relay 1AC in FIGURE 3b. Thus the series circuit for relays AB and KR was transferred from that previously described and was re-established from T1 through C4S to T1b and the series connection of contacts 1b of the digit selector relays D–0B through D–9B to the line 38. Upon the energization of the digit selector relay D–9B the series circuit to line 38, that is, the line established by T1b and the series connection of 1b contacts of the digit selector relays was broken thus causing the de-energization of relays KR and AB. Consequently, the contacts 3a of relay AB, see FIGURE 3c, are returned to their normally closed position, and thus a signal voltage is sent from line T1 of FIGURE 3c, through the now closed contacts 1 of the cycle selector relay BS, and the contacts 3a of the relay AB to the line SIG.

The previously described document feed cycle now occurs with respect to the second document causing it to be placed upon the trackway such that it proceeds down the trackway towards gate 9. Although a potential has been established across the gate operating solenoid 09 the said gate will not energize and open the gate until line F (FIGURE 3d) is transferred to the full potential of line T2. Referring to FIGURE 3e, as the clutch cycles C1S is opened thus disconnecting line F. C2S is operated and transfers to the hotline T2. After C2S transfers its contacts, C1S closes and thus connects line F to the hotline T2. This function occurs at approximately 50 degrees of rotation of clutch ORC. When C1S closes full potential is applied to the gate solenoid causing it to energize and open gate 9. At the same time contacts 09a of the gate solenoid close to thereby connect gate solenoid 09 in parallel with gate solenoid 34. The latter solenoid energizes and opens trackway gate 34. As gate solenoid 34 energizes it closes its contacts 34a to thus transfer the top side of both solenoids 09 and 34 to bus T1. As will be obvious gate solenoid power for gates 09 and 34 is now established directly from T1 as well as through the previously described circuits made by decade relay DC–0B, digit relay D–9B and alternate store transfer relay 1AC. This latter named circuit is now redundant and can be eliminated in view of the gate solenoid holding circuit established by gate solenoid 34.

As clutch ORC cycles cam C2 operates C2S again to transfer line F to reduced voltage line RA to thereby complete the holding circuit for gate solenoids 09 and 34. Following the second operation of C2S cam C3 trips C3S open thus breaking power line T1a to all of the digit and decade relays of the A signal store. Consequently decade relay DC–5A and digit relay D–1A are de-energized thus erasing the previously punched in information concerning gate 51.

With D–5A de-energized its 1a contacts reverse to 1b thus closing the series circuit of 1b contacts through the digit A store relays. When C3S closes the line T1a is once again closed. After the opening and closing of C3S, C5 is effective to operate C5S to the open position. With the opening of C5S all of the alternate store transfer relays 1AC–10AC are de-energized thereby returning all of their contacts to the positions shown in the drawings. This action results in the transferral of the keyboard back to the A signal store. At the same time relays KR and AB are energized in that line T1a is now connected to line 38 through contacts 13a of relay 1AC.

In addition the redundant circuit for solenoid 09 comprising contacts 12 of decade relay DC–0B, contact 2 of digit relay D–9B, line 29B and armature 1 of relay 1AC is opened in that the armature 1 transferred to contacts 1a with the de-energization of 1AC. The input information is retained in relays DC–0B and D–9B; these will be cancelled when C4 next operates C4S. But gate solenoids 09 and 34 remain energized through the holding circuit established when gate solenoid 34 was energized.

The holding circuit is maintained until C1S is once more opened to thereby open power line F which is common with the bottom side of solenoids 09 and 34. This event does not occur until the next cycling of the clutch ORC which occurs after information is placed in the now empty A signal store.

Essentially the same form of holding circuit is established for each of pair of gates in the P–2 and S–2 sections of the trackway there being however a modification with respect to the S–2 section. If the selected bin is 04 then the gates for both bins 29 and 04 must be operated and of course, the gating solenoids are paralleled by the aforedescribed method with respect to gates 09 and 34. For the 04–29 cases the holding circuit is established by the gate 29.

Operation of gate 39 in the S–1 section (of the trackway

As previously stated upon the operation of C3S the information stored in the A signal for gate 51 was removed by de-energizing the decade relay DC–5A and the digit relay D–1A. Consequently the A store is now empty and ready to receive a signal input. Too, the series circuit for energizing relays KR and AB was again completed such that the said relays are energized and holding. The operator is passing information to the A stores for bin 39 first presses key 3 to establish a circuit though contacts 11a of the alternate switch relay 4AC, contacts 9a of the cycle A selector relay AS to one side of the decade relay DC–3A thus energizing the relay which is held energized by the closing of its 1 contacts in the same manner described heretofore relative to the energization of decade relay DC–5A for gate solenoid 51. In a like manner, the cycle selector relay AS is energized at this point by the closing of the contacts 2 of the decade relay DC–3A thus completing a circuit from the line 36, contacts 1b of relay AB, line 34, contacts 2 of DC–3A, line 32 to one side of the relay AS, the other side of the relay AS, being connected to the hotline T2c. Accordingly, the cycle selector relay AS is energized and its contacts are reversed. Its holding circuit is established from line T1, through contacts 13a of relay 10AC and the now closed contacts 2 of relay AS to line 32 and AS.

At this point the operator would press the key 9 thus applying bus T1 through contacts 2b of the relay AB, contacts 11A of the transfer relay 10AC, the now closed contacts 3b of relay AS to a line 3A'. Line 3A' connects to one side of digit relay D–9A the other side of which is connected to T2a. D–9A energizes reversing its contacts and establishing its holding circuit through contacts 1a with line T1a.

Referring now to gate solenoid 39 in FIGURE 3B, when decade relay DC–3A energized it operated its contact 12 to the left such that contact 12 connected to a terminal tied to a power line 29A. The line 29A was connected to the bus line T1 upon the energization of the digit relay D–9A through the digit relays number 2 contacts. It will be noticed that although the decade and digit information has been stored in the A signal stores the gate solenoid 39 has not been operated in that it is necessary for the alternate store transfer relay 4AC to be energized such that its contact 1a is transferred to a terminal 1b associated with the gate solenoid 39 before the gate solenoid can be energized.

As in previous cases a signal is sent over the line SIG in that the energization of the digit relay D–9A broke the series circuit in the line T1a in order to establish the holding circuit for the digit relay. Upon the breaking of the line T1a potential was removed from the line 38 and the relays KR and AB de-energized such that contacts 3a of the relay AB returned to their normally closed position thus applying a potential from line T1 to line SIG as previously described. Accordingly, the clutch ORC is engaged and cycled until eventually C5S is closed such that it re-energizes the alternate store transfer relays 1AC through 10AC. Upon the energization alternate store transfer relay 4AC transfers its contact 1a associated with gate solenoid 39, to terminal 1b thus completing the circuit from T1 through line 29a, contact 12 of DC–3A, contact 1b and armature 1a of 4AC to the gating solenoid 39; solenoid 39 now energizes in that it is connected to its opposite side to hotline T2. Gate solenoid 39 upon receiving potential opens gate 39 such that document receiving bin 39 is now exposed such that it can receive the document designated for it.

It will be noted that a switch 14a is located immediately to the right of the gating solenoid 39. The said switch 14a is connected to and is operated by gating solenoid 14 in the event that a document is designated for bin number 14. Essentially, the same procedure described heretofore with respect to gates 09 and 34 would be followed except that solenoid 39 does not form a holding circuit for gates 39 and 14.

Referring to FIGURE 3e it will be seen that gate 39 was not opened until after the information stored in the B stores relative to the operation of gate 09 had been removed by the operation of C4S. Thus, the B stores were emptied of their decade and digit information, and subsequent to that event the alternate store transfer relays were energized through the closing of C5S causing the opening of gate 39. Consequently as the document for which the numbers 39 were used was placed on the trackway; while it was in the P-1 section of the trackway C1S opened closing gates 34 and 09 ahead of it. As the document travels in the P-2 section of the trackway C5S operated thus opening gate 39 in section S-1. About the time the document clears section P-2, the clutch ORC returns to its home position. The document is, at this point, traveling in the S-1 section and headed for gate 39; the document is deposited in the bin 39 before the clutch ORC completes a half revolution upon its next cycling. Gate 39 stays open for about one full clutch cycle and is closed upon the operation of C3S during a subsequent cycling of the clutch. Thus gate solenoid 39 is de-energized upon the erasure of the information from the store that caused it to energize.

Energization of gate solenoid 45 in section S-2

As previously stated the clutch cycling relative to the entry of information for gate solenoid 39 and consequently document receiving bin 39 simultaneously cleared the information retained in the B stores entered for gate 09. The B signal stores are clear and ready to receive information for the next document to be placed on the trackway. It will be assumed that the document is coded for bin 45, and the previously described operations relative to punching information into selected decade and digit relays respectively for bin 45 is performed by the operator. Consequently decade relay DC-4B is energized and holding through its contacts 1. The cycle B selector relay BS is energized through contacts 2 of relay DC-4B and holding. With the operation of key 5 a circuit is established, in the manner previously described, to energize digit relay D-5B over line 7B'. The digit relay is holding through its now made contacts 1a, and applies line T1 to a power line 25B.

Referring to gating solenoid 45 in FIGURE 3B it will be noted that decade relay DC-4B caused a contact 8 to be connected to the line 25B. Solenoid 45 is not connected to contact 8 because the cycling of the clutch relative to the energization of gate 39 in section S-1 of the trackway caused the energization of the alternate store transfer relays 1AC through 10AC. Therefore with the information inputted to the DC-4B decade relay and the D-5B digit relay the movable armature for the alternate storage transfer relay 5AC is presently making with contact 5b thus solenoid 45 cannot have a potential applied to it until relay 5AC is de-energized.

Upon energizing the digit relay D-5B the series circuit for the line T1b was broken and thus causing a voltage signal to be applied on the line SIG. The clutch ORC is engaged and the switching operation performed by the cams C1 through C5 are again performed. On this operation of the clutch the information read into the A stores for bin 39 is cancelled by the switching of C3S. Subsequent to the cancellation of information relative to gating solenoid 39, C5S is opened by the cam C5 thus de-energizing the alternate store transfer relays. Armature 5a of relay 5AC transfers from the 5b contacts to the reverse contacts thus connecting line 25B through the contact 8, armature 5a to the top of solenoid 45. The bottom side of the said solenoid is connected to a conductor R which conductor is placed in a series circuit with a pair of trackway switches M1S and M2S; refer to FIGURE 3d. M2S is shown closed in series with the reduced voltage line RA such that the voltage applied across the solenoid 45 by the de-energization of relay 5AC is insufficient to energize the gate solenoid 45.

Both M1S and M2S are trackway switches and may be of the limit switch type. Switch M1S is located along the upper portion of the trackway immediately adjacent to the entry portion for the S-1 section of the trackway. Switch M2S is located at the rearward portion of the S-1 section of the trackway. Switch M1S is so positioned that any document designated for a document receiving bin in either sections S-1 or S-2 of the trackway must trip the switch. In a like manner, M2S is so positioned that any document directed to the latter portion or that is, the S-2 portion of the trackway must trip M2S.

During the interim, or that is, while the clutch is cycling the document has been traveling down the trackway. Ts previously described the speed of the trackway is such that the document arrives at section S-1 at about the time clutch ORC returns to its HOME position. As the document passes from the P-2 section onto the S-1 section of the trackway it trips the switch M1S momentarily thereby breaking the connection of line RA to line R to de-energize any gates that may have been previously energized in the S-2 section of the trackway. It will be noticed that all gates in the S-2 section of the trackway are connected in common to line R and are in series with switches M1S and M2S.

Once the document enters section S-1 of the trackway and has cleared switch M1S all further operations for placing the document into bin 45 is under the control of the switch M2S. If at this point the operator cycles the clutch once more by placing information in the A stores the document designated for bin 45 will clear section S-1 and trip switch M2S before the clutch rotates for one-half revolution. At the moment the document trips M2S it causes line R to be transferred to T2 thus supplying full power to solenoid 45 causing the solenoid to be energized and open its corresponding gate. Referring to FIGURE 3B, it will be seen that when the gate solenoid 45 is energized it closes a pair of contacts 45a to create a holding circuit from the line T1. Thus the information contained in the B stores relative to the decade relay DC-4B and the digit relay D-5B can be erased in that the holding operation for the solenoid 45 is independent of the information contained in the signal stores.

After the document trips switch M2S the switch returns to the position shown in FIGURE 3B, to thereby reconnect line R to the reduced voltage line RA which as heretofore stated supplies a sufficient voltage to hold the gate solenoid 45 energized.

It is therefore obvious that gate 45 will remain open until a subsequent document trips M1S to open line R. It will also be noted that contact 20a is located immediately to the right of the solenoid 45 in FIGURE 3B of the drawings. The contact 20a is connected directly to the gating solenoid 20 and it closes when solenoid 20 is energized. The contact is utilized to connect the solenoid 20 in parallel to the solenoid 45 in the event that a document had been designated for bin 20. The arrangement is precisely the same as that described heretofore with respect to the operation of gates 9 and 34 in the P-2 section of the trackway.

Repeat cycle

In the course of mailing documents it frequently occurs that a great number of documents are distributed to the same coded mailing areas. For example, the utilities in billing their customers usually have a large volume of mail directed to a specific post office, thus the code numbers for the postal destination are repeated for a great number of times during such mailings. Taking the previously described 45 designation in the S-2 section of the trackway it will be assumed that an operator of the document sorter is confronted by a great number of documents bearing the same code designation. By operating a key RPK shown in the lower left hand corner of FIGURE 3C, it is possible for the operator to transfer the signal 45 between the A and B stores in the control circuitry of this invention. It will be noted that one side of the contacts for key RPK are connected directly to the bus line T1 and that the other side of the contacts are connected to one side of a repeat relay RP. The opposite side of the repeat relay RP is connected directly to the hotline T2, thus the operator by pressing RPK effects the energization of relay RP.

Having previously described the inputting of information to the B stores for the number 45 it will be recalled that the consequential cycling of the clutch ORC caused the clearing of the A stores such that the A stores are now ready to receive information. When key 4 was first pushed to originally energize the decade relay DC–4B the holding contacts 1 for the decade relay closed placing the potential of line T1 on the right hand contact 8A of the B cycle selector relay BS. In so doing, the same potential was placed at the right hand contact of the terminals associated with the bridging contact 13 of the repeat relay RP. When the relay RP is energized its contacts 13 close thus establishing a circuit from the right hand contact 8A of relay BS through the contacts 13 to the right hand contact 8A of the A cycle selector relay AS, and from there to the decade relay DC–4A causing the said relay to be energized closing its holding contacts 1, and at the same time energizing the A cycle selector AS through contacts 2 of the decade relay DC–4A.

Simultaneously with the above events a digit transfer circuit is established relative to the circuits associated with key 5 to effect the transfer of information from digit relay D–5B to digit relay D–5A. It will be noted that a pair of stationary contacts are associated with the movable arm 10 of the repeat relay RP with the right hand stationary contact being connected to line 7B' which line is at the T1 potential on the digit relay D–5B. Upon operation of the relay RP the armature 10 closed on the two said stationary contacts thus completing a circuit from line 7B' to line 7A' to thereby effect the energization of digit relay D–5A.

It will thus be seen that the information stored in the decade and digit relays DC–4B and D–5B respectively is transferred to the A store decade and digit relays DC–4A and 4–5A respectively by the operator merely pressing key RPK. Upon completing the transfer of information to the A store from the B store the clutch ORC is once again cycled and on this cycling clears the information in the B store, specifically, DC–4B and D–4B. A subsequent depression of the repeat key RPK will transfer the information now stored in the decade DC–4A relay and the digit relay D–5A back to the corresponding B stores. This operation can be repeated just as long as it is necessary.

Clear operation

In that the document sorter is a high speed machine just as a typist will make occasional errors in operating an electrical typewriter, the operator of the document sorter will on occasion inadvertently enter either the wrong decade number or the wrong digit number into the signal stores. In the event that an error has occurred the operator can cancel out the erroneously entered decade and/or digit information by pressing a clear button CRK on the keyboard which button applies power to a clear relay CR; see FIGURE 3C. It will be noticed that the clear relay is connected directly to the hotline T2 and when the clear key CRK is pressed the other bus T1 is applied to the other side of the clear relay.

Upon energization of the relay CR its contacts reverse thus breaking the connections to line T2a, T2b and T2c. Since all of the A decade and digit relays are tied on one side to the line T2a, and since all of the B decade and digit relays are connected on one side to the line T2b, by breaking the circuits to line T2a and T2b all of the decade and digit relays in both the A and B stores are de-energized such that their contacts return to their normally inoperative positions. In a like manner, with the breaking of the power line T2c, power is removed from one side of each of the feed relays FC1, FC2, and FC3 as shown in FIGURE 3e, of the drawings. Accordingly, with the feed relays de-energized the clutch and feed solenoids are also de-energized. This immediately stops the feeding operation and causes the clutch ORC to disengage.

It will be recalled that gates in the P–1 section of the trackway opened upon the entry of information into the appropriate decade and digit relays associated with the selected gate, thus when information is removed from the decade and digit relays by the operation of the clear key CRK the gate solenoid in the P–1 section is de-energized and the gate will close. The situation is somewhat different for sections P–2, S–1, and S–2 in that there is a certain amount of delay before the gate solenoids are operated after the entry of information into the stores concerning gate solenoids in the said sections. Accordingly, if an error occurs the operator has an opportunity to correct the error prior to the opening of the gates in either of the said sections thus cancelling out erroneously entered information.

Reject operation

Although the document sorting machine is provided with a hundred document receiving bins thus allowing for one hundred different document destinations on some occasions a document having a coded designation different from that of any of the said receiving bins will appear before the operator. On such occasions the operator may feed the document onto the trackway and allow it to proceed all the way down the trackway into a reject bin stationed at the end of the document moving trackway. In order to accomplish this function, the operator is provided with a reject key RJK shown in the lower right hand corner of FIGURE 3e. When the reject key is pressed it immediately connects bus T1 to line SIG thus initiating a feed cycle as stated heretofore. It should be obvious from the prior description that the cycling of the clutch initiated by the pressing of the reject button is sufficient to cancel out information relative to any of the gates in the P–1 and S–1 section of the trackways thus insuring that gates in the said sections of the trackway are closed by the time the reject document reaches them. In addition, as described with respect to the selection of gate 39 in the S–1 section of the trackway the cycling of the clutch effects the opening of switch C1S thus causing a de-energization of gate solenoid 34 which had maintained a holding circuit for gate solenoids 34 and 09 thereby effecting the closing of gates 34 and 09. Also as stated previously, the document upon tripping the limit switch M1S effects the cancellation of the holding energy on gate solenoids for the S-2 section of the trackway thereby closing gates in the said section. Accordingly, the reject document travels the entire length of the trackway to reach a reject document receiving bin.

Although the foregoing description is necessarily of a detailed character in order that the invention may be completely set forth, it is to be understood that the specific terminology employed is not intended to be restrictive or confining, and that various re-arrangements of parts and modifications of detail may be resorted to without departing from the scope or spirit of the invention as herein claimed.

I claim:

1. In a document sorting machine having a trackway for guiding documents therealong and having a plurality of document deflection gates arranged along said trackway in at least two displaced trackways sections, a control system for selectively opening the said gates, the control system including:

- a gate operating solenoid associated with each document deflection gate;
- at least two multi-digit signal storage means for storing multi-digit signals representing any of the document deflection gates each of said storage means being provided with means for selecting any gate solenoid in the system for energization;
- input means for generating multi-digit signals that are characteristic to each of the gate solenoids;
- means for sequencing said input means to each of said multi-digit storage means such that multi-digit signals representing a first number are entered into one storage means and multi-digit signals representing another number are entered into the other storage means;

switch means for effecting energization of gate solenoids for gates located in both sections of the trackway to thereby open selected gates, said switch means being in part operably connected to said means for sequencing said input means such that said switch means is operable to energize gate solenoids for gates located in a first section of the trackway in a first time period and is operable to effect energization of gate solenoids for gates located in a second section of the trackway in a subsequent time period;

holding means associated with certain ones of the gate solenoids for gates in each section of the trackway for maintaining energized gate solenoids in that condition regardless of whether the signals used to select the gates have been erased from the multi-digit storage means; and means operably associated with each of the multi-digit storage means for erasing information therein.

2. A document sorting machine according to claim 1 wherein said input means includes means for generating two digit signals; and wherein each of said multi-digit signal storage means includes a first storage for storing the most significant digit of said two digit signals and a second store for storing the least significant digit of said two digit signals; and wherein each of said multi-digit storage means includes means for transferring said keyboard from said first store to said second store.

3. A document sorting machine according to claim 1 wherein said means for erasing information from each of said multi-digit storage means includes cam operated switches connected in power lines where the power lines are connected to the storage means.

4. A document sorting machine according to claim 1 wherein said switching means includes a document operated switch for energizing selected gates in the second section of the trackway.

5. A document sorting machine according to claim 1 wherein each gate solenoid associated with said holding means is provided with a holding contact connected in parallel to the solenoid; and wherein the holding means includes sources of reduced power connected to the solenoids, and includes means for switching the said source to and from a source of power sufficient to energize selected gate solenoids.

6. In a document sorting machine having a document conveying trackway and having a plurality of normally closed document deflection gates arranged along said trackway in at least four longitudinally displaced trackway sections, and having a document feed means for placing documents on the trackway, a control system for operating the document feed means and for selectively opening the gates, the control system including:

a gate operating solenoid associated with each document deflection gate;

at least two double-digit signal storage means for storing two digit numeric signals representing any of the document deflection gates, each of said storage means being provided with means for selecting any gate solenoid in the system for energization;

input means for generating double-digit signals unique to each gate solenoid in the system;

document feed control means connected to said input means for operating said document feed means in response to the entry of information into one of said stores;

holding means operably connected to gate solenoids corresponding to gates in second and fourth sections of the trackway for maintaining selected gates in the said sections energized subsequent to their energization, said holding means being independent of said double-digit storage means such that information may be erased from the storage means without affecting a solenoid under the control of the holding means;

timing means operably connected to said document feed control means for sequencing the operation of said machine subsequent to the entry of information into a double-digit storage means, the said timing means including:

(a) means for interrupting the holding means control over gate solenoids for gates located in the second section of the trackway for a period and for supplying sufficient power to energize gate solenoids in said section during the period of interruption;

(b) means operably connected to each of said double-digit storage means for erasing information from those storage means that are not connected to the input means to receive information;

(c) storage transfer means for shifting said input means from the last storage means into which information was entered to an empty storage means;

switching means for interrupting the holding means control over gate solenoids for gates in the fourth section of the trackway, for supplying enabling power to the said solenoids and for restoring the holding means; and means at each gate solenoid and associated with the solenoid selection means of each double-digit storage means for completing enabling power paths to the solenoids.

7. A document sorting machine according to claim 6 wherein said input means includes disabling means for preventing the entry of further information until after operation of the feed control means.

8. A document sorting machine according to claim 6 wherein said holding means includes a parallel circuit for each gate solenoid for gates in the second and fourth sections of the trackway for applying energizing power across selected solenoids; and reduced power holding sources for the solenoids associated with gates in the second and fourth sections of the trackway.

9. A document sorting machine according to claim 6 wherein said holding means includes reduced power lines for the gate solenoids for gates in each of the second and fourth sections of the trackway; and wherein said means for interrupting the holding means control over gate solenoid for gates in the second section of the trackway includes switch means for opening the reduced power line for the said solenoids, to thereafter apply the said line to a source of sufficient magnitude to energize solenoids in the section, and to thereafter return the solenoids to the reduced power line.

10. A document sorting machine according to claim 6 wherein the last named means is operably associated with the timing means and the double-digit storage means such that enabling power is supplied subsequent to the entry of information in timed sequence to gate solenoids for gates in the first three sections of the trackway.

11. A document sorting machine according to claim 10 wherein the means for completing enabling power paths to the solenoids is operably associated with the switching means to supply enabling power for gate solenoids for gates located in the fourth section of the trackway.

12. A document sorting machine according to claim 10 wherein said input means includes double-digit signal transfer means for transferring information entered in one double-digit storage means to the other double-digit storage means.

13. In a document sorting machine having a document conveying trackway and having a plurality of document deflection gates distributed along said trackway, a control system for selectively opening the said gates, the control system including:

a gate operating solenoid associated with each document deflection gate;

a plurality of multi-digit signal storage means for storing multi-digit signals representing any of the document deflection gates, each of said storage means including a separate digit storage for each digit in a multi-digit signal, and each digit storage being provided with means for selecting any gate solenoid in the system for energization;

input means for generating multi-digit signals that are characteristic to each of the gate energization;

means for connecting said input means to each of said storage means such that said multi-digit signals are applied in sequence to each of said storage means;

digit transfer means for connecting the input means to each digit storage of a storage means, while said input means is connected to the storage means, such that each digit signal of a multi-digit signal is entered according to its order of significance in the multi-digit signal into a separate digit storage;

said means for connecting the input means to the storage means also including means for enabling the energization of gate solenoids for which characteristic signals have been entered into said storage means such that selected gates are opened; and means for erasing the information entered in each of said multi-digit storage means.

14. A document sorting machine according to claim 13 wherein each digit storage comprises a bank of signal relays; and wherein said transfer means includes at least one transfer relay for transferring the input means from a first bank of storage relays to a second bank of storage relays.

15. A document sorting machine according to claim 13 wherein said connecting means comprises an on-off switching means; the said switching means when in an off condition being operative to connect said input means to a first multi-digit signal storage means and when in an on condition being operative to connect said input means to a second multi-digit signal storage means.

16. A document sorting machine according to claim 15 wherein said on-off switching means comprises a bank of relays connected to be energized by a cam opated switch.

17. A document sorting machine according to claim 13 wherein said means for erasing the information in each of said multi-digit storage means includes switching means for de-energizing each storage means after information entered into each such storage means has been used to effect energization of a gate-operating solenoid.

References Cited

UNITED STATES PATENTS

| 3,340,354 | 9/1967 | Lodenhamp | 340—359 |
| 3,128,093 | 4/1964 | Highsmith | 271—64 |
| 3,021,509 | 2/1962 | Swartz | 340—166 |
| 3,259,238 | 7/1966 | Swartz | 209—72 |

RICHARD E. AEGERTER, Primary Examiner

U.S. Cl. X.R.

214—11; 340—166; 209—72

UNITED STATES PATENT OFFICE
CERTIFICATE OF CORRECTION

Patent No. 3,507,491                                                  April 21, 1970

Richard L. Swartz

It is certified that error appears in the above identified patent and that said Letters Patent are hereby corrected as shown below:

Column 8, line 1, "time" should read -- timing --. Column 9, line 9, "2R" should read -- KR --. Column 10, line 7, "key S" should read -- key 5 --. Column 11, line 69, after "signal" insert -- store --; line 75, "is" should read -- in --. Column 16, line 63, "trackways" should read -- trackway --.

Signed and sealed this 22nd day of December 1970.

(SEAL)
Attest:

Edward M. Fletcher, Jr.                          WILLIAM E. SCHUYLER, JR.
Attesting Officer                                    Commissioner of Patents